United States Patent [19]
Leszczynski

[11] 3,822,800
[45] July 9, 1974

[54] APPARATUS FOR TRANSPORTING TRANSFORMERS AND THE LIKE

[76] Inventor: Stanley Leszczynski, Elk Creek Rd., Schenevus, N.Y. 12155

[22] Filed: Nov. 4, 1971

[21] Appl. No.: 195,592

[52] U.S. Cl.................. 214/370, 214/372, 280/5 H
[51] Int. Cl............................................... B62b 3/08
[58] Field of Search................ 214/370, 372, 83.24; 280/5 D, 5 H, 5 E, 501

[56] References Cited
UNITED STATES PATENTS

| | | | |
|---|---|---|---|
| 372,976 | 11/1887 | Heilman | 214/372 |
| 951,239 | 3/1910 | Garrett | 280/5 E |
| 2,981,152 | 4/1961 | Miller | 214/38 B |
| 3,003,654 | 10/1961 | Pelto | 214/370 |
| 3,363,787 | 1/1968 | Macomber | 214/370 |
| 3,421,644 | 1/1969 | Butcher | 280/5 E |
| 3,547,291 | 12/1970 | Batterton | 214/501 |
| 3,578,353 | 5/1971 | Lockhart | 214/370 |

*Primary Examiner*—Robert G. Sheridan
*Assistant Examiner*—Kenneth Noland
*Attorney, Agent, or Firm*—Leon Nigohosian

[57] ABSTRACT

An apparatus suitable for transporting a relatively large body, e.g., an electrical transformer, that includes one or more projections thereon, including a structure comprising a plurality of wheels and means defining a slot adapted to receive the projection therewithin, the body being removably connectable to the apparatus at the projection or projections.

11 Claims, 6 Drawing Figures

APPARATUS FOR TRANSPORTING TRANSFORMERS AND THE LIKE

The present invention relates to a wheeled vehicle, and particularly to such a vehicle that is especially suitable for transporting a relatively large body, such as a transformer.

While technological advances have been made in many areas of the materials-handling field, there remain certain noteworthy exceptions where relatively cumbersome and costly techniques are still used. One such exception is in the area of transformer manufacture and handling, including transformer installation, particularly in connection with intermediate size transformers, e.g., those weighing about 100 pounds or more, up to about 1,200 pounds. Intermediate size transformers that are mountable on, for example, a utility pole, are a familiar sight and are known to the art, as well as outside the art. Such mountable transformers usually include one or two hanger members connected to and projecting from the main (i.e., cylindrical or box-shaped, in many cases) portion of the transformer, such hanger members often being in the form of substantially U-shaped structures that can be closed at one end of the channels thereof. The hanger members, where there are two, are spaced apart and aligned with each other and lie on a plane that includes the principal axis of the transformer.

In the manufacture and installation in the field of intermediate size transformers, it is a common practice to move about finished transformers by having two or more men, usually four men in the case of such transformers weighing several hundred pounds, carry the transformers with slings. Such a practice is expensive in view of the number of man-hours often expended in this effort, but, even more important, this practice is dangerous to the employees involved since they can injure themselves by lifting such great weights or they can be injured by the transformers falling on their feet or otherwise.

Also, because such transformers often have a large number of appendages thereon, e.g., lightning arresters, connection terminals, etc., these transformers cannot readily be transported in a horizontal position on a flat-bed hand cart or even on a cart having an arcuate cradle thereon, since such an arrangement requires the main body portion of the transformer, which main portion carries the above appendages, to be disposed on the bed or cradle and any contact between these appendages and the bed or cradle might result in damage to the former. On the other hand, the transport of a transformer in a vertical, i.e., upright, position on a flat-bed hand cart is not desirable, especially where the transformer is to be installed on a utility pole, etc., and it is necessary to transport it over rough terrain. This is because the high position of the center of gravity of the upright transformer makes the transformer unsteady in moving it over rough terrain, which often is the case where the transformer is to be installed in remote or inaccessible areas or in areas that are in the process of being developed, or in moving it up inclines.

The present invention allows large bodies, such as transformers, to be moved about with relative ease and safety, a single person generally being able to load and transport such bodies by himself. The present invention allows a transformer to be moved over rough terrains or up and down inclines without any problem of unsteadiness of the transformer on the apparatus of the invention and with relative ease, thereby facilitating installation of transformers in the field. The invention also allows the removal of a transformer from a storage area where transformers are located in close proximity to each other, with relative ease, the apparatus of the invention exhibiting a high degree of maneuverability. Also, the present invention allows a transformer to be moved over snow, etc., with relative ease, to a point where it is going to be installed. The invention is, therefore, particularly suitable for the electric power industry.

It is an object of the present invention to provide an apparatus for moving relatively large bodies with relative ease and safety.

Other objects and advantages of the present invention will become apparent from the following description taken in conjunction with the accompanying drawing, in which.

Generally speaking, the present invention includes a wheeled vehicle comprising a support structure, slot-defining means mounted on the support structure, and a cross-member that is disposed generally transversely to the slot. Such an apparatus is particularly suitable for transporting transformers, especially those of the mountable (i.e., hanging) variety having "ears" or mounting hanger members thereon, in which case the slot is at least as long as the sum of the lengths of the hanger members and the distance therebetween. The transformer is removably connectable to the vehicle by means of the hanger members and, more preferably, is also movable on the vehicle along at least a portion of the slot when the transformer is removably connected or secured to the vehicle, the cross-member being adapted to limit the movement of the transformer along the slot.

Figure 1:
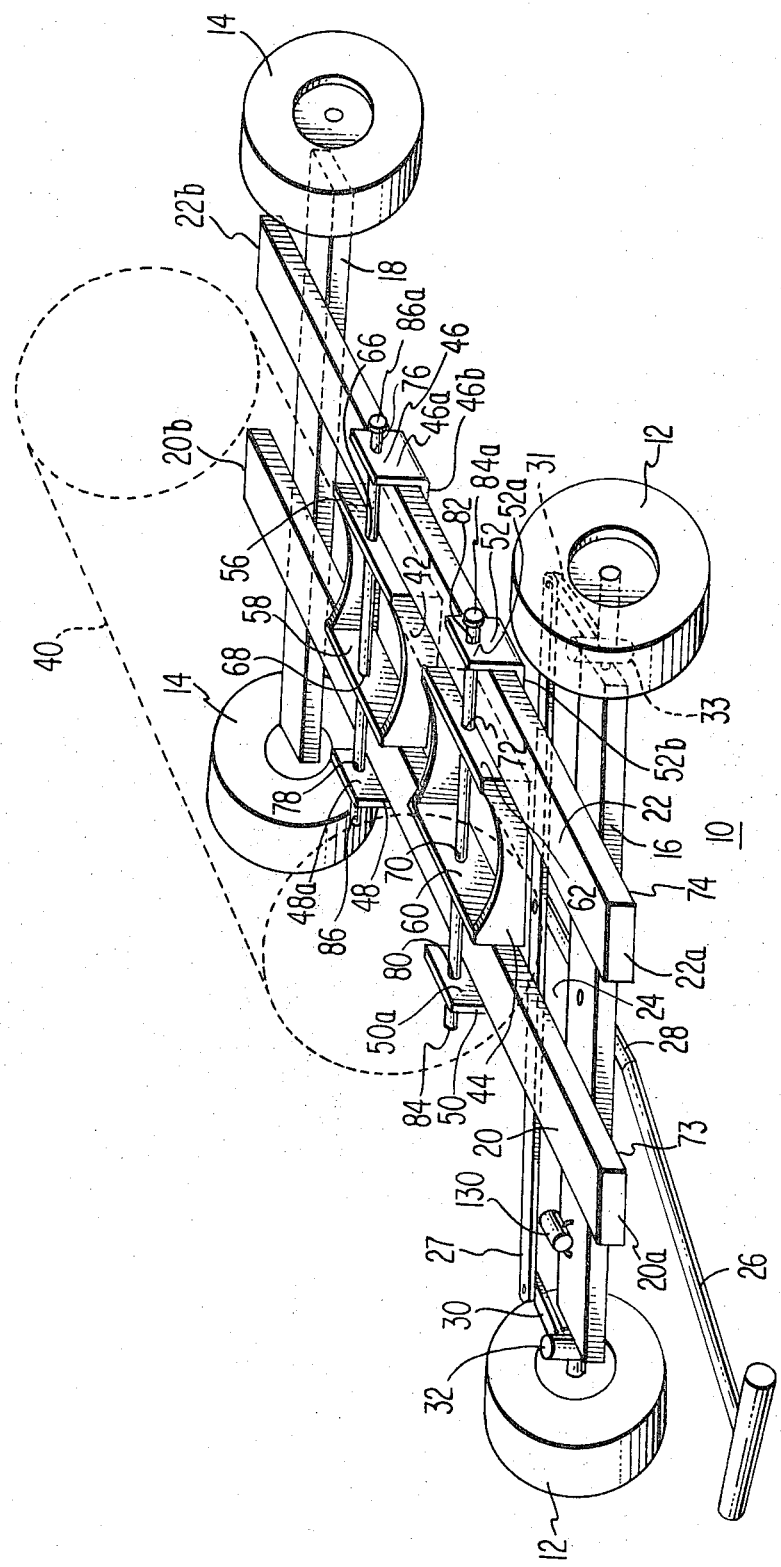
FIG. 1 is a perspective view of a wheeled vehicle in accordance with one embodiment of the invention, the vehicle having mounted thereon a transformer that is partly depicted by phantom lines.

More specifically, in one embodiment of the invention, the wheeled vehicle 10 (FIG. 1) includes forward and rear wheels 12 and 14 respectively, and forward and rear axle members 16 and 18, respectively, that carry the wheels 12, 14. Disposed above the axles 16, 18 are two substantially parallel, spaced apart support members 20, 22, which are located substantially parallel to the principal axis of the vehicle 10, these support members 20, 22 defining a slot 24. The support members 20, 22 can be located directly on the rear axle member 18, as shown in FIG. 1, in which case the rear axle member 18 is disposed substantially transversely to the slot and serves as the cross member to limit the sliding motion of a transformer secured to the vehicle 10, as described below. Alternatively, an intermediate structural element (not shown) can be disposed between the support members 20, 22 and the rear axle member 18, in which case the intermediate element member 18 can serve as the motion-limiting member, i.e., the cross-member, of the vehicle 10. The support members 20, 22 can be disposed directly on the forward axle member 16, as shown in FIG. 1, or an intermediate structural element (not shown) can be located therebetween. There is also located at the forwarded end of the vehicle 10 a handle 26 for pulling and directing the vehicle 10, the handle 26 being connected by an intermediate tongue member 28, which is pivotally connected to the forward axle 16, to a toggle linking mechanism 27 that serves to turn the wheels 12 via two oppositely-disposed steering members 30, 31 of the toggle mechanism that are connected the wheels 12 through the kingpins 32, 33.

Where the wheeled vehicle 10 is to be used to transport a mountable transformer that includes aligned hangers or "ears", the slot is sufficiently long to receive the hangers without any impediment, so that the distance between the forward and rear axles, 12 and 14, respectively, should be at least as long as the sum of the lengths of the hangers and the distance therebetween, and, preferably, as shown in FIG. 1, significantly exceeds this sum so that the transformer is slidable (i.e., movable) on the vehicle over at least a portion of the slot. For the reasons explained below, it is most preferred that the slot length and the location of the motion-limited cross-member, i.e., the rear axle member 18 in FIG. 1, be such that the transformer is slidably mountable on the vehicle 10 and can assume and maintain a position on the vehicle 10 where the center of gravity of the transformer is located substantially at or proximate to a point directly over the rear axle member 18.

As shown in FIG. 1, a mountable transformer 40 (the main or cylindrical, portion thereof being shown in phantom view for purposes of clarity) that includes two hanger members 42 and 44 projecting therefrom (which hanger members are depicted by solid lines), can be removably connected to the wheeled vehicle, and according to a more preferred aspect of the invention is connected so as to be also slidable on the vehicle 10. Although the wheeled vehicle provides advantages whether the transformer is removably, but non-slidably, connected to the vehicle 10 as with suitable holding members, further advantages can be derived in loading and unloading the transformer where the transformer is removably connected to the wheeled vehicle 10 so as to be slidable or otherwise movable along at least a portion of the slot. The hanger members 42, 44 of the transformer 40, are disposed within the slot 24. The width of the slot 24 is at least equal to, and preferably exceeds somewhat, the width of the hanger members 42, 44, e.g., the slot can for standard transformers exceed by about one-half inch the width of the hanger members, the amount by which the slot exceeds the hanger member width being determined by the configuration and size of the connecting members used to connect the transformer to the vehicle.

The transformer 40 can be slidably and removably connected to the wheeled vehicle 10 according to a further embodiment by means of holding members, e.g., 46, 48, 50, and 52 of FIG. 1, that take advantage of oppositely disposed, apertured side plates 56, 58 and 60, 62 that usually are included as part of the hanger members 42 and 44, respectively, such side plates generally projecting out from the main portion of the transformer 40. The apertures 66, 68 and 70, 72 of each hanger member 42 and 44, respectively, are aligned with each other and a rod, pin, etc. can be passed unobstructed through both apertures of a hanger member. In this embodiment, each one of the holding memers 46 through 52 is elongated and of substantially L-shaped cross-sectional configuration. The holding members 46 through 52 include apertures 76, 78, 80 and 82, respectively, at the vertical portions 46a, 48a, 50a and 52a respectively, thereof. These apertures 76, 78 and 80, 82 are located such that each one of them is substantially aligned with the apertures 66, 68 and 70, 72 respectively of an associated hanger member 42, 44 when the holding members are disposed such that the horizontal portions 46b, 48b, 50b and 52b thereof substantially engage the under surfaces 73 and 74, (FIG. 3) respectively of the support members 20, 22. Therefore, it is preferred that the distance between the aperture (e.g., 76) of the vertical portion (e.g., 46a) and the horizontal portion (e.g., 46b) of a holder member (e.g., 46) be substantially equal to or only slightly exceed the height (thickness) of a support member (e.g., 22). It is also preferred that the apertures of the hanger members 42, 44 and of the holding members 46 through 54 be of substantially the same diameter.

With the tranformer 40 disposed on the vehicle 10 such that the hanger members 42 and 44 are located within the slot 24, each hanger member 42, 44 is provided with a pair of holding members as shown in FIG. 1, the apertures of the holding members and their associated hanger member being aligned after which a pin or rod member 84, 86 is passed through each group of aligned apertures, as shown in FIG. 1. Each pin includes a head portion, 84a, 86a, that is larger than the diameter of the holding member apertures so as to prevent the complete passage of the pin through the apertures, the length of each pin or rod member exceeding the width of the slot 24. Portions of each pin near or at the end opposite the head portion, or portions which are located at or over the slot when the pin is placed in the apertures, are preferably provided with means for preventing the unintentional removal of the pins from the apertures; for example, these portions of the pins opposite the head include holes extending diametrically through the pins so that a cotter pin can be inserted therein. Such an arrangement permits a transformer to be mounted on the vehicle with minimal sidewise or rotational movement of the mounted transformer during transport thereof. The transformer thus mounted on the vehicle 10 is carried by the pins 84, 86, which rest on the support members 20, 22, the main portion of the transformer being located in this embodiment above the support members 20, 22 so as to avoid damaging the appendages thereon. Where the pins are cylindrical in cross-sectional shape, the movement of the transformer along the slot is facilitated by the rolling action of the pins. Because of the relatively low position of the center of gravity of the transformer as it is mounted on the wheeled vehicle 10, the transformer remains relatively steady, even when it is transported over rough terrain, over snow, up or down inclines, etc., thereby facilitating the handling thereof.

Figure 2:
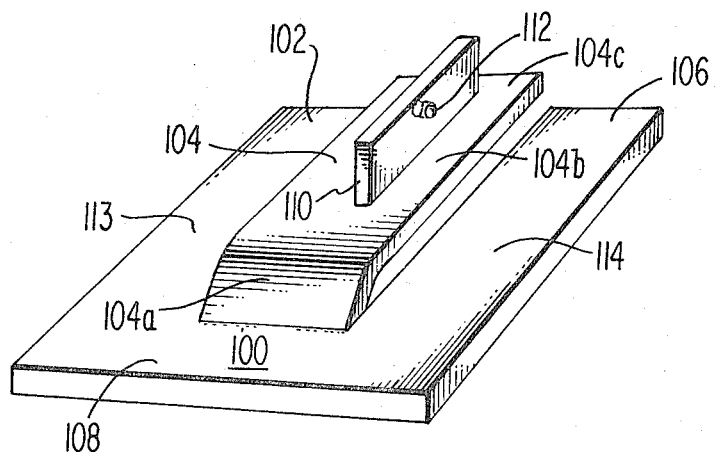
FIG. 2 is a perspective view of a holding member in accordance with another embodiment, the holding member being useable to retain a transformer on the wheeled vehicle of the invention.

In another embodiment, the holder members of the type indicated as 100 (FIG. 2) that can be used to mount a transformer on the wheeled vehicle comprise generally anchor-shaped parts. Such a holder member 100 includes three prong-like elements 102, 104, 106 that are interconnected by a common element or strip 108 and extend generally in the same direction. The two outer prong elements 102, 106 lie substantially in the same plane and are, for example, flat strips, whereas the intermediate prong-like element 104 generally lies in a plane that is removed from and substantially parallel to the plane of the outer prong-like elements 102, 106, a curved portion 104a connecting the main portion 104b of the intermediate element 104 to the common strip 108. An apertured plate member 110 is attached to the face 104c of the intermediate element 104 (e.g., the plate member 110 can be welded to the prong-like element 104, or they can be produced as a single piece), which face is removed from the outer prong elements 102, 106 so that the intermediate prong element generally has an inverted T-shaped cross section. The plate member 110-intermediate element 104 assembly is adapted to be inserted within the hanger member, e.g., 42 or 44 (FIG. 1) of a transformer, the aperture 112 of the plate member 110 being located so as to be aligned substantially with the apertures of the hanger member (e.g., 66, 68) when the upper faces 113 and 114, respectively, of the outer prong-like members 102, 106 substantially engage the under faces 73, 74 (FIG. 3) of the support members. Such a holding member 100 can be used in the manner similar to that described above; that is, the holder members are disposed so that the outer prong-like elements 102, 106 thereof engage the under faces of the support members and the intermediate element 104 and plate member 110 are disposed within the hanger member and a pin or rod (e.g., 86 in FIG. 1) is inserted through the aligned apertures of the hanger member (e.g., 42 in FIG. 1) and plate member 110, the pin or rod being held in place by, e.g., a cotter pin inserted therein at the portion that is removed from the headed portion thereof and is located at the slot. The distance between the aperture 112 of the plate member and the plane including the top faces 113 and 114 respectively of the prong elements 102, 106 preferably is only slightly greater (e.g., about ⅛ inch) than the height of the support member so as to provide clearance between the prong elements 102, 106 and the support member, thereby allowing the transformer to be moved along the support members with relative ease.

The support members 20, 22 of the wheeled vehicle 10 can be horizontal or they can be obliquely disposed with respect to the horizontal, the forward ends thereof 20a, 22a, being higher, in the latter case, than the rear ends 20b, 22b. For example, the support members can make an angle of up to about 15 degrees or about 30 degrees or more with the horizontal. The inclined orientation of the support members allows a transformer to be mounted on the vehicle 10 without danger that the terminals, lightning arresters and other appendages to the transformer at the upper portions thereof, will be damaged by striking the front wheels since these appendages will be located above the front wheels. Of course, a horizontally disposed slot-defining means (e.g., support members 20, 22) can be used with relatively small-diameter wheels at the forward part of the vehicle so as to avoid damage to these transformer parts, but larger wheels are preferred for maneuverability of the vehicle. Also, while a two-piece slot defining means is shown in FIG. 1, a single piece such means (not shown) can be used.

In a further embodiment, (FIG. 3) there is disposed on the vehicle 10, at the underside of the slot-defining means, i.e., the spaced apart members 20, 22, and in the vicinity of at least the rear axle member 18, a strip element 120 that is substantially coincides with at least portions of the slot 24 proximate to the rear axle member 18 and spaced from the slot 24 by a distance that is selected such that the motion of the hanger members 42, 44 of the transformer in the slot 24 is not impeded, the spacing distance preferably being greater than the amount by which the hanger members 42, 44 extend below the support members 20, 22 when the vehicle 10, with the transformer 40 thereon, is in a horizontal position and more preferably being at least about the depth of the hanger members. The strip element 120 extends for at least a portion of the slot length and can be connected near one end thereof 12a to the rear axle member 18 via an intermediate spacing element 119 and near the other end 120b to one or both of the support members 20, 22 (the latter being shown in FIG. 1) by means of a suitable brace member 126. The strip element 120 can extend the entire distance between the forward and rear axles, if desired, or even beyond the axles and its width can be greater than, equal to, or less than that of the slot. The strip element serves as a safety device in the loading and unloading of the transformer or other load in the manner described below.

In another embodiment, there is disposed at the forward portion of the vehicle, e.g., on the forward axle member, as shown in FIG. 1, a guide member 130 wherethrough a chain or cable or the like can be passed, which guide member is utilized in conjunction with the chain, cable, etc., in moving the transformer or other load on the vehicle, a more detailed description being given below.

Figure 4:
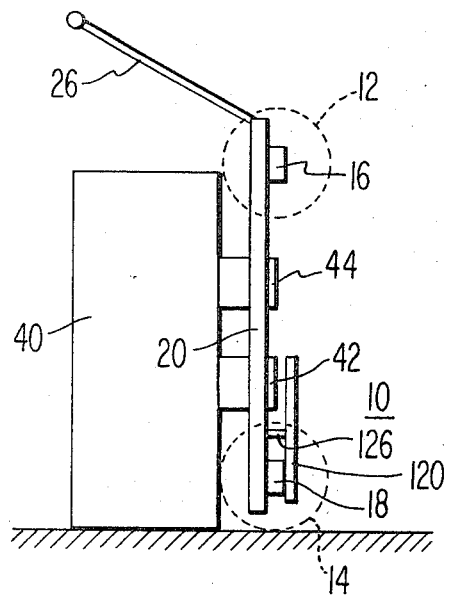
FIGS. 4 through 6 are side views of a simplified representation of a wheeled vehicle of the present invention at various stages of mounting a transformer thereon.
Figure 5:
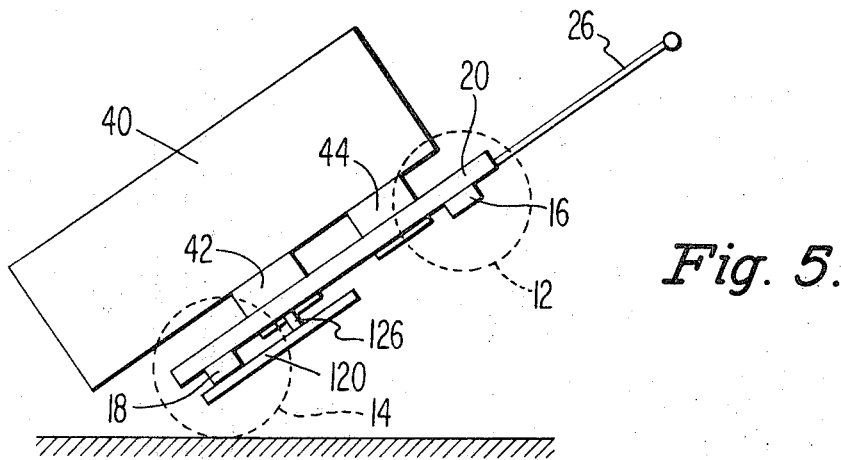

To mount a transformer 20 (FIG. 4, where numerals identical to those of other figures indicate corresponding parts) which includes two hanger members 42, 44 on the wheeled vehicle 10 (whose wheels are shown in phantom view for clarity of description) of the present invention, the forward end of the vehicle 10 is raised so that the vehicle assumes a generally vertical position. The hanger members 42, 44 are inserted into the slot defined by the support members (only one support member 20 being shown) and suitable holding members (not shown; e.g., those shown in FIGS. 1 or 2) being placed at the hanger members, as described above, so that the transformer is secured to the vehicle 10 such that it is movable (e.g., slidable) along the slot. Thereafter, the forward end of the vehicle is tipped forward, as shown in FIG. 5, the vehicle 10 rotating about the rear wheels 14 thereof. Because the transformer 40 can move or slide along the slot, the transformer 40 moves toward the rear of the vehicle 10 as the vehicle is rotated toward a horizontal position. The center of gravity of mountable transformers generally is located within the lower half thereof, so that as a result of the movement of the transformer 40 along the support members, the center of gravity is shifted toward the rear axle member 18, thereby shifting more weight onto the rear wheels 14 and greatly reducing the effort required to rotate or lower, the vehicle to a horizontal position. As the wheeled vehicle 10 is rotated more toward a horizontal position, the lower hanger member 44 moves toward the cross-member, i.e., the rear axle member 18, which limits the sliding motion of the transformer by engaging the lower hanger member 44. Hence, by locating the cross-member (i.e., the rear axle member 18) such that the center of gravity of the transformer is proximate to or coincides with a point above the rear axle member 18, substantially all of the weight of the load will be borne by the rear wheels as the wheeled vehicle is lowered into a horizontal position. It is preferred that the cross-member be disposed such that less than one-half of the transformer length is located to the rear of the rear axle member 18.

Figure 6:
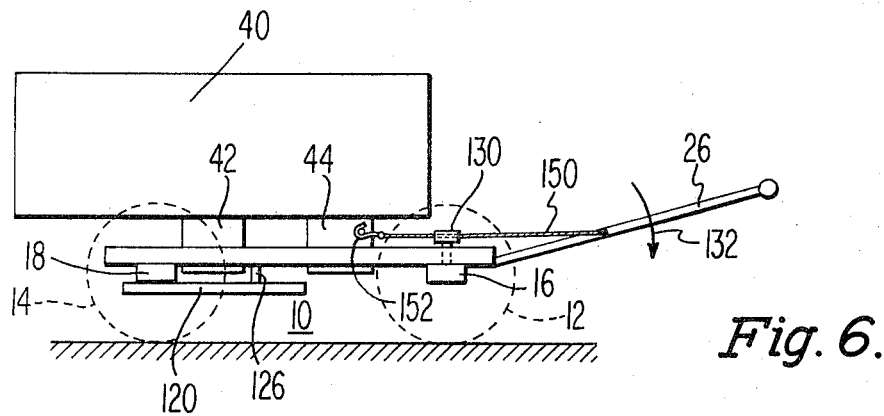

Because a workman may place his foot in the vicinity of the rear axle member 18 as he rotates the vehicle 10, this to prevent the linear (i.e., forward or rearward motion) movement of the vehicle 10 at the expense of rotational movement and/or for leverage, the strip element 120 prevents his placing his foot at the point of the rear axle member 18 that engages the hanger member 44 of the transformer 40, thereby avoiding injury to the workman's foot. When the vehicle 10 assumes a horizontal position (FIG. 6) the lower hanger member 42 engages the rear axle member (or whatever else the motion-limiting cross piece might be), the slot length being such and the motion limiting cross piece preferably being located so that the center of gravity of the transformer can be disposed over or near the rear axle member 18, thereby greatly facilitating the rotation of the transformer bearing vehicle, such rotation being desirable in loading and unloading the transformer. When the vehicle 10 carrying the transformer 40 has been rotated to a horizontal position, it can then be moved toward the forward end of the vehicle by means of a cable that is secured to the transformer at one end and passes through the guide member and then transported to its destination.

Figure 3:
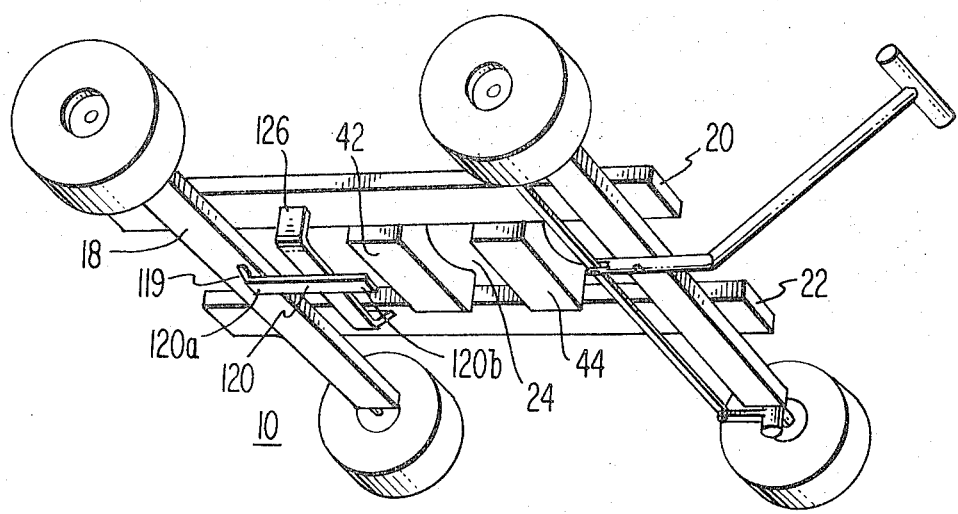
FIG. 3 is a perspective view of the wheeled vehicle of FIG. 1 in a vertical position, only hanger members of the transformer being shown for clarity of description.

To unload the transformer 40, the vehicle 10 (FIG. 6) need merely be rotated about its rear wheels so that it again assumes a vertical position, as in FIG. 3 (it again being pointed out that because the center of gravity of the transformer is arranged to be at or near a point above the rear axle member 18, such rotation is relatively easy and can be done by one person) so that the transformer 40 is disposed on the floor, after which the transformer can be disconnected from the vehicle 10.

Because the wheeled vehicle is rotated in the loading and unloading operations, it is preferred that at least a portion of the rear wheels extend beyond the rear edge of the slot-defining means so the vehicle be rotatable on the rear wheels, thereby facilitating such rotation.

Where it is desired to move the transformer 40 (FIG. 6) forward on the vehicle 10 one end of a cable 150, chain or the like can be connected to, for example, a hanger member (e.g., 42) by means of a hook, 152, which cable or chain passes through a guide member 130 and is attached at the other end to the handle 26 of the vehicle so that the handle 26 can be used as a lever by pulling it away from the vehicle as shown by the arrow 132, thereby sliding the transformer 40 forward. The guide member 30 serves to prevent the cable or chain from hitting and damaging the lightning arresters or other appendages to the transformer at the top portion thereof. To slide the transformer 40 toward the rear of the vehicle 10, the chain or cable, which is connected to the hanger member 42, for instance, is arranged so it passes from the hanger member 42, around the rear axle 18, and to the handle 26, so that pulling the handle away from the vehicle 10 (in the direction of the arrow 132) will cause the transformer to be pulled toward the rear.

The wheeled vehicle and the various holding members of the invention can be made from various materials, but steel is generally preferred, the various parts being, for example, welded together.

Also, the transformer can be disposed on a wheeled vehicle of the present invention such that the main portion of the former is disposed on the support members of the vehicle.

While the present invention allows the ready movement of a secured transformer along the slot of the vehicle, the transformer is not freely movable by itself while it is being transported, the substantial weight of these transformers generally requiring a relatively small force to move them. Such lack of freedom of movement of a transformer by itself is desired to avoid shifts in weight during movement thereof.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. An apparatus suitable for transporting an electrical transformer including a main portion and at least one hanger projection thereon extending from said main portion, comprising:
   a. a structure including a plurality of wheels and being rotatable between substantially horizontal and vertical positions, and
   b. oppositely disposed slot defining elements adapted to receive said hanger projection therebetween, said elements being disposed on said structure and being adapted so that said body is both removably connectable to said apparatus at said hanger projection and slideable along at least a portion of said slot, said elements being spaced apart by a distance exceeding the width dimension of said projection, said width dimension extending transverse to said elements and said elements having a thickness less than the thickness of said projection such that when said transformer is mounted on said apparatus said projection extends through said slot and beyond said elements in the direction away from said main portion and said elements being oriented substantially parallel to the principal axis of said structure, in combination with said transformer removably mounted on said structure with said projection extending through said slot, said transformer being removably connected to said structure via connecting means attached to said projection.

2. The apparatus defined in claim 1, further comprising a cross-member disposed substantially transversely to said slot, and being adapted to limit the sliding motion of said body along said slot, said body being slidable in said slot when said body is removably connected and unconnected.

3. The apparatus defined in claim 2, further comprising a rear axle and rear wheels disposed on said axle, said cross-member being disposed such that while said body is removably connected to said apparatus said body is movable to a position where the center of gravity of said body is proximate to a point directly above said rear axle.

4. The apparatus defined in claim 2, wherein said slot-defining elements include a rear edge and said apparatus comprises oppositely disposed rear wheels, at least a portion of said rear wheels being located beyond said rear edge.

5. The apparatus defined in claim 1, comprising a rear axle and rear wheels oppositely disposed on said rear axle, said cross-member being disposed such that an electrical transformer removably connected thereto and including upper and a lower hanger members is movable over said slot-defining elements toward said rear wheels only as far as a position where said lower member engages said cross-member and where less than one-half the length of said transformer is located to the rear of said rear axle when said lower hanger member engages said cross-member.

6. The apparatus defined in claim 1, wherein said slot-defining elements comprise two members disposed substantially parallel to the principal axis of said apparatus.

7. The apparatus defined in claim 1, further comprising a rear axle member and rear wheels oppositely disposed on said axle, said rear axle member comprising said cross-member.

8. The apparatus defined in claim 1, further comprising a rear axle and rear wheels oppositely disposed on said axle, said slot-defining elements being disposed directly on said rear axle.

9. The wheeled vehicle defined in claim 1, wherein said slot-defining elements comprises a forward end and a rear end, said slot-defining elements being obliquely disposed with respect to the horizontal such that said forward end is higher than said rear end.

10. The wheeled vehicle defined in claim 9, wherein said slot-defining elements is disposed at an angle of up to at least about thirty degrees with respect to the horizontal.

11. The wheeled vehicle defined in claim 1, wherein said vehicle includes a guide means disposed at a forward portion of said vehicle, whereby a chain or cable can be used to move said body substantially without any contact between said chain or cable and portions of said body.

* * * * *